United States Patent
Milinski et al.

(10) Patent No.: US 8,345,541 B2
(45) Date of Patent: Jan. 1, 2013

(54) PROVIDING SERVICES IN CASE OF CALL DIVERSION IN A COMMUNICATION SYSTEM

(75) Inventors: Alexander Milinski, Munich (DE); Jiadong Shen, Munich (DE); Jozsef Varga, Nagydobsza (HN)

(73) Assignee: Nokia Siemens Networks Oy, Espoo (FI)

( * ) Notice: Subject to any disclaimer, the term of this patent is extended or adjusted under 35 U.S.C. 154(b) by 1085 days.

(21) Appl. No.: 12/232,171

(22) Filed: Sep. 11, 2008

(65) Prior Publication Data

US 2009/0073964 A1 Mar. 19, 2009

(30) Foreign Application Priority Data

Sep. 12, 2007 (EP) .................................. 07017871

(51) Int. Cl.
*H04M 3/42* (2006.01)
*H04Q 7/20* (2006.01)
*G01R 31/08* (2006.01)

(52) U.S. Cl. ..... 370/225; 455/417; 455/433; 455/435.1; 370/221

(58) Field of Classification Search ................. 370/352, 370/221, 225; 455/417, 433, 435.1
See application file for complete search history.

(56) References Cited

U.S. PATENT DOCUMENTS

| | | | |
|---|---|---|---|
| 7,403,517 B2 * | 7/2008 | Westman | 370/352 |
| 7,801,116 B2 * | 9/2010 | Westman | 370/352 |
| 8,031,591 B2 * | 10/2011 | Shi | 370/225 |
| 2007/0191004 A1 * | 8/2007 | Yamakawa et al. | 455/433 |
| 2008/0039081 A1 * | 2/2008 | Ma et al. | 455/433 |
| 2008/0064398 A1 * | 3/2008 | Zhu | 455/435.1 |
| 2008/0182575 A1 * | 7/2008 | Torres et al. | 455/435.1 |
| 2010/0008254 A1 * | 1/2010 | Schneyer et al. | 370/254 |
| 2010/0009681 A1 * | 1/2010 | Schneyer et al. | 455/435.1 |
| 2010/0136970 A1 * | 6/2010 | Mui et al. | 455/435.1 |
| 2011/0151865 A1 * | 6/2011 | Lau et al. | 455/433 |
| 2011/0151871 A1 * | 6/2011 | Naqvi et al. | 455/435.1 |
| 2011/0275372 A1 * | 11/2011 | Shi | 455/435.1 |
| 2012/0020350 A1 * | 1/2012 | Tai et al. | 370/352 |
| 2012/0028622 A1 * | 2/2012 | Eardley et al. | 455/417 |
| 2012/0140764 A1 * | 6/2012 | Sheth et al. | 370/352 |
| 2012/0177194 A1 * | 7/2012 | Yoon et al. | 379/212.01 |

FOREIGN PATENT DOCUMENTS

| | | |
|---|---|---|
| CN | 1859426 A | 11/2006 |
| EP | 1675347 A1 | 6/2006 |
| WO | WO 2006/125474 A1 | 11/2006 |

OTHER PUBLICATIONS

M. Barnes, Network Working Group, RFC 4244, An Extension to the Sessioninitiation Protocol (SIP) for Request History Information, Nov. 2005, pp. 1-44.

(Continued)

*Primary Examiner* — Lisa Hashem

(74) *Attorney, Agent, or Firm* — Squire Sanders (US) LLP

(57) ABSTRACT

The present invention relates to an S-CSCF receiving a terminating request associated with a called user and executing services for the called user. The S-CSCF determines an indication in Session Case indicating originating services handling in call forwarding situation, and based on this executes a subset of services for the user.

15 Claims, 1 Drawing Sheet

OTHER PUBLICATIONS

Digital cellular telecommunications system (Phase 2+); Universal Mobile Telecommunications System (UMTS); IP Multimedia (IM) Subsystem Cx and Dx Interfaces; Signalling flows and message contents (3GPP S 29.228 version 7.4.0 Release 7), Dec. 2006, pp. 1-61.

3rd Generation Partnership Project; Technical Specification Group Core Network; IM Multimedia Call Control Protocol based on SIP and SDP; Stage 3 (Release 5), 3GPP TS 24.229 V5.3.0, Dec. 2002, pp. 1-120.

3GPP TS 23.228 V8.1.0, 3$^{rd}$ Generation Partnership Project; Technical Specification Group Services and System Aspects; IP Multimedia Subsystem (IMS); Stage 2 (Release 8), Jun. 2007, a total of 226 pages.

3GPP TS 24.173 V7.1.0, 3$^{rd}$ Generation Partnership Project; Technical Specification Group Core Network and Terminals; IMS Multimedia Telephony Communication Service and Supplementary Services; Stage 3 (Release 7), Jun. 2007, a total of 13 pages.

3GPP TS 24.229 V8.0.0, Pi Generation Partnership Project; Technical Specification Group Core-Network and Terminals; IP multimedia call control protocol based on Session Initiation Protocol (SIP) and Session Description Protocol (SDP); Stage 3 (Release 8), Jun. 2007, a total of 438 pages.

RFC 4244, An Extension to the Session Initiation Protocol (SIP) for Request History Information, Nov. 2005, a total of 42 pages.

* cited by examiner

PROVIDING SERVICES IN CASE OF CALL DIVERSION IN A COMMUNICATION SYSTEM

TECHNICAL FIELD OF THE INVENTION

The invention relates to a method providing services in case of a call diversion occurs in a communication system and to a system, serving entity and register entity for the same.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Diameter protocol has been defined by IETF and is intended to provide an Authentication, Authorization and Accounting (AAA) framework for applications such as network access or IP mobility.

Different types network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS).

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc.

The HSS is responsible for holding the following user related information:

User Identification, Numbering and addressing information;
User Security information: Network access control information for authentication and authorization;
User Location information at inter-system level: the HSS supports the user registration, and stores inter-system location information, etc.;
User profile information.

Call forwarding or call diversion is a service in which the called user may activate a service to forward/divert an incoming call or session to new destination if predetermined conditions exist. These conditions may be e.g. that the called user does not answer, or is busy or that incoming calls are always forwarded. In IMS network upon detecting a call forwarding, the S-CSCF procedure stops executing the services of the served or called user (the user who has activated call forwarding) and does not allow the execution of any further services. However in some cases it may necessary to execute the originating services of the served user after the call forwarding (diversion) is detected.

Solutions to this situation have been discussed before. First proposal is so called P-Served-User based approach which has been discussed in IETF document draft-vanelburg-sip-ping-served-user-01 and in related discussion paper discussed at CT#48 (document number C1-071596).

P-Served-User approach proposes to use the "orig" parameter to indicate that originating services of the served user must be executed.

However, this solution may cause problems: if originating and terminating S-CSCF functionalities are separated, the returning request is routed to an originating S-CSCF, which will consider the request as a returning request (the original dialog identifier is there), but either does not have the related dialog or (if the calling party is served by the same S-CSCF) the related dialog serves the calling party and thus the original dialog identifier is not acceptable for that dialog (or it is accepted and S-CSCF assumes that the request is returning from the application server (AS) after performing the originating service of the calling party, although the AS already served the forwarding party).

Another proposed solution is SIP History-Info based approach discussed in IETF document RFC 4244 and in related discussion paper discussed at CT#48 (document number C1-071682).

History-Info approach proposes to use the existence of the SIP History-Info header to indicate that originating services of the served user must be executed. This proposal also has drawbacks. If an AS works according to the supplementary service specification for Call Diversion, then it must add the History-Info and still may intend to indicate that originating services are not needed. Also it is possible that History-Info is already in the message (although S-CSCF after detecting call forwarding may check whether the last entry of the History-Info header includes the served user or not)

Both approaches propose a solution where the AS controls the service execution (by inserting "orig" parameter/History-Info header), this may enable smart users to skip e.g. barring service.

The object of the invention is to overcome the above drawbacks

SUMMARY OF THE INVENTION

The present invention overcomes the above problem by providing a register entity and a method comprising storing service related data associated with a user of a communication network
transmitting part of the service related data to a control entity in the communication system
wherein the storing covers storing in the service related data an indication indicating originating services handling in call forwarding situation and wherein the transmitting means is configured to transmit to the control entity the indication indicating originating services handling in call forwarding situation.

Register entity may be a HSS. The register entity may transmit the indication to an Interrogating Call State Control Function (I-CSCF) as part of a capability requirements parameter comprising capability requirements for a Serving Call State Control Function (S-CSCF) to be assigned for a user. The register entity may transmit the indication to a Serving Interrogating Call State Control Function (S-CSCF) as part of a filter criteria. The indication may be a Session Case of an IP Multimedia subsystem (IMS)

Also a control entity and method is provided, comprising:
storing information about serving entities of a communication system and about capabilities of the serving entities;
selecting a serving entity to serve a user of the communication system wherein the selection is made based on the capabilities of the serving entities stored, and
server capabilities received from a register entity,
wherein the selection is further based of an indication in the server capabilities indicating originating services handling in call forwarding situation and capabilities of the serving entities of the communication system to support originating services handling in call forwarding situation.

A serving entity and method for it is provided, comprising:
receiving a terminating request associated with a called user,
executing services for the called user
determining an indication associated with the called user and indicating originating services handling in call forwarding situation, and the based on the indication, a set of services is executed for the user.

The serving entity may obtain service related information associated with user from an external server and configured to receive the indication indicating originating services handling in call forwarding situation from the external server. The set of services executed may comprise a subset of originating services of an IP Multimedia Subsystem. The serving entity may be a Serving Call State Control Function (S-CSCF) on an IP Multimedia Subsystem Network and the indication indicating originating services handling in call forwarding situation may be obtained as part of filter criteria from a home subscriber server (HSS). The serving entity may determine the indication indicating originating services handling in call forwarding situation as part of analysis of a Session Case of an IP Multimedia subsystem (IMS).

The above may be implemented by software code adapted and loaded into the memory of a computer.

The present invention has the advantage that it provides more appropriate service handling in case of a call forwarding when only part of originating services are executed for forwarding user.

DETAILED DESCRIPTION OF THE INVENTION

Figure 1:
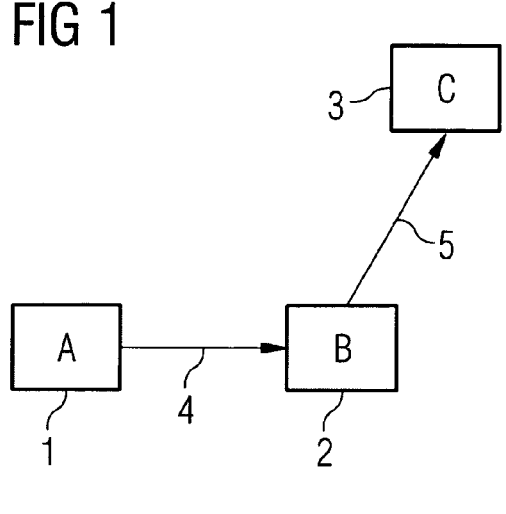
FIG. 1 presents a typical call forwarding case

The present invention relates to IMS (IP Multimedia Subsystem) service execution procedure. Service execution procedure is described in 3GPP TS 23.228 and in 3GPP TS 24.229. IMS supplementary services are described in 3GPP TS 24.173. Current procedures do not support the execution of originating services of forwarding user and it is not defined clearly what services must be executed whenever an S-CSCF detects a call forwarding and decides to execute originating services of the served user. Possibilities are:

all originating registered services
subset of originating registered services (e.g. Voice Call Continuity is probably no needed);
all originating unregistered services
subset of originating unregistered services Initial filter criteria (iFC) is stored in the home subscriber server (HSS) as part of the user profile and is downloaded to the serving call state control function (S-CSCF) upon user registration. The initial filter criteria represent a subscription of a user to an application. The initial filter criteria are valid throughout the registration lifetime or until the user profile changes.

IMS Session Case, as defined in 3GPP TS 29.228, is information that is used as a filter criteria class to indicate if the filter should be used by the S-CSCF handling the originating services, terminating services, or terminating for an unregistered end-user services.

In order to support the S-CSCF selection and to allow the S-CSCF to perform its tasks, the Cx interface must support transferring following information:

transfer of CSCF-UE security parameters from HSS to CSCF. The security parameters allow the CSCF and the UE to communicate in a trusted and secure way.

transfer of service parameters of the subscriber from HSS to CSCF. This may include e.g. service parameters, Application Server (AS) address, triggers, information on subscribed media etc. The information on subscribed media is provided in the form of a profile identifier; details of the allowed media parameters associated with the profile identifier are configured in the S-CSCF.

transfer of CSCF capability information from HSS to CSCF. This may include e.g. supported service set, protocol version numbers etc.

transfer of session signalling transport parameters from CSCF to HSS. The HSS stores the signalling transport parameters and they are used for routing mobile terminated sessions to the Serving-CSCF. The parameters may include e.g. IP-address and port number of CSCF, transport protocol etc. The information mentioned above shall be transferred before the CSCF is able to serve the user. It shall also be possible to update this information while the CSCF is serving the user, for example if new services are activated for the user.

According to the invention a new session case is proposed to be introduced for originating services after call forwarding.

An I-CSCF is selecting an S-CSCF to serve an IMS user according to Server Capabilities it receives from the HSS. Preferably such S-CSCF must be selected from a list of available S-CSCFs and stored in the I-CSCF that fulfills all the capability requirements set is Server Capabilities. According to the invention one of the capabilities may be an indication that the S-CSCF to be selected shall be able to process iFCs with a Session Case indication "Originating handling and Call Diversion" received from the HSS in the user profile. This indication may be introduced as a new parameter in capabilities and is below presented as one possible implementation option in Table 6.7. of 3GPP TS 29.228 section 6.7. "S-CSCF assignment", (new part in Italic font).

| Capability | Mandatory or Optional (note 1) | Description |
|---|---|---|
| Support of "Wildcarded PSI" | M | This capability indicates that the assigned S-CSCF shall support the handling of Wildcarded PSIs. |
| Support of "OrigUnreg SPT" | M | This capability indicates that the assigned S-CSCF shall be able to process iFCs with a Session Case "Originating_Unregistered" received from the HSS in the user profile. |
| Support of "OrigCDIV SPT" | M | This capability indicates that the assigned S-CSCF shall be able to process iFCs with a Session Case "Originating_CDIV" received from the HSS in the user profile. |

"ORIGINATING_CDIV" is an example name used for this new parameter in the following description. The name of the parameter is not important, decisive is the meaning of the parameter, i.e., that it indicates that a call forwarding has occurred and this may require different handling in service execution in the S-CSCF assigned for the user.

When an S-CSCF receives an initial request for a dialog (e.g. SIP INVITE) or a request for a standalone transaction, prior to forwarding the request, the S-CSCF shall among other things, check many things from SIP headers in the received request as specified in section 5.4.3.3. of 3GPP TS 24.229. According to one aspect of the invention the S-CSCF shall assess triggering of services for the served user and this decision is configured in the S-CSCF using any information in the received request that may otherwise be used for the initial filter criteria. The S-CSCF may decide to stop evaluating current iFC when detecting "ORIGINATING_CDIV" handling and instead build an ordered list of iFC based on the "ORIGINATING_CDIV" services of the public user identity of the served user. In this case the Session Case for the S-CSCF is set to "ORIGINATING_CDIV" and the S-CSCF will continue with procedures as described for request originated by the served user. The identity of the forwarding user may be available in the History-Info header if ASs in the iFC supports Hist-Iinfo option tag and thus will be aware that it is triggered to perform the originating service of the forwarding user.

When determining "ORIGINATING_CDIV", it may not be necessary for the S-CSCF to execute all originating (registered or unregistered) services. The selection what services to execute after forwarding may be done by carefully defined conditions in the iFC. However using a new Session Case minimizes the need for additional conditions. Conditions for originating services already include a "SessionCase=ORIGINATING" (and/or "SessionCase=ORIGINATING_UNREGISTERED") condition. By introducing a new SessionCase for this scenario (e.g. "ORIGINATING_CDIV"), the addition of a "SessionCase=ORIGINATING_CDIV" condition can control whether the service may be triggered after forwarding/diversion and there is no need to do checks for forwarding related headers in service point trigger (SPT) once more to detect the forwarding once more, as the S-CSCF has already done that.

In FIG. 1, a normal call forwarding situation is shown. An A party 1 is calling to a B party 2, the request 4 (e.g. SIP INVITE) is transmitted from the A party's network towards the B party's network. The B party 2 has activated a call forwarding feature to a C party 3. The B party's 2 network detects the call forwarding and takes care of forwarding the received request 4 to new destination (here to the C party 3) as shown as transmitted request 5.

Figure 2:
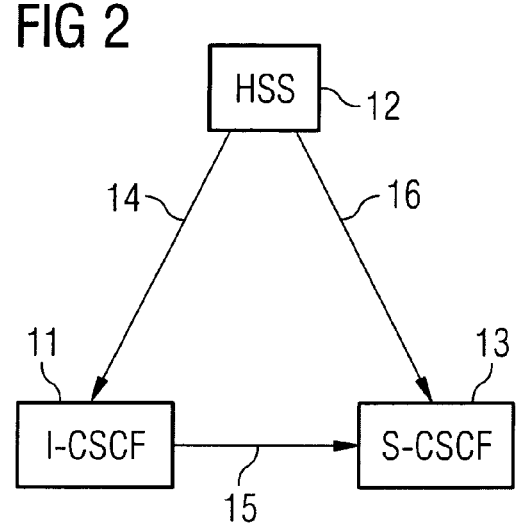
FIG. 2 presents the network elements and part of the message flow according to this invention.

FIG. 2 shows an embodiment of this invention. A HSS 12 is storing e.g. subscription information and user profiles for users of the IMS network. According to one aspect of the invention the HSS 12 transmits in a message 14 to an I-CSCF 11 to support S-CSCF assignment in the I-CSCF 11, a new "ORIGINATING_CDIV" parameter is in server capabilities. Based on this parameter, the I-CSCF 11 selects such S-CSCF (here S-CSCF 13) to serve the user (not shown) that support special service execution for originated services in call forwarding case. A request for a new session received from the user (not shown) is transmitted to the selected S-CSCF 13 in step 15. The S-CSCF 13 contacts the HSS 12 to download an initial Filter Criteria and user profile of the user. In message 16 the HSS 12 returns to the S-CSCF 13 the requested information including a new Session Case "ORIGINATING_CDIV" according to the invention when applicable. When detecting session Case "ORIGINATING_CDIV", the S-CSCF 13 may decide upon different handling and execution of origination services for the forwarding user. For example, the S-CSCF 13 may skip execution of such services which do not make sense or are not logical to execute in the call forwarding situation.

Figure 3:
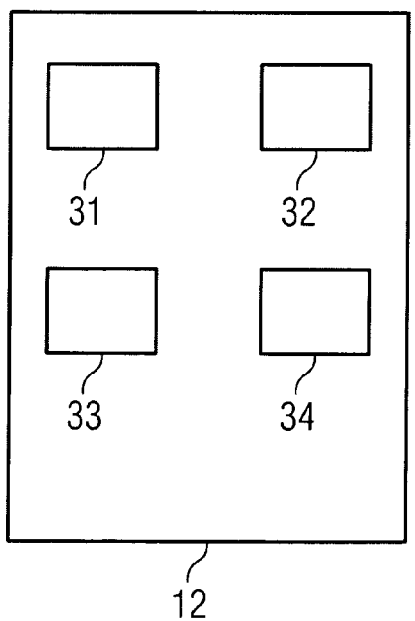
FIG. 3 presents the internal structure of HSS according to the invention

FIG. 3 shows the internal functions of the HSS implementing the invention. The HSS 12 includes maintaining unit 31 which maintains user profiles and (initial) filter criteria for the users of the network. The HSS 12 also comprises updating unit 32 which updates the above information based on event occurring in the network and based on operator configuration. E.g. changing registration states, application settings and setting server capabilities including the Session case. The HSS 12 comprises receiving unit 33 for receiving requests and queries from I-CSCFs and S-CSCF of the network and transmitting unit 34 for transmitting responses to the I-CSCFs and S-CSCFs. The request, queries and responses may be received and transmitted according to Diameter protocol.

Figure 4:
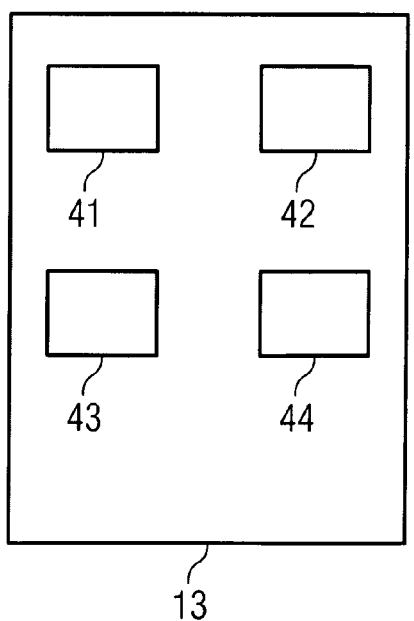
FIG. 4 presents the internal structure of S-CSCF according to the invention

FIG. 4 shows the internal functions of the S-CSCF implementing the invention. The S-CSCF 13 includes receiving unit 41 for receiving incoming request from user of the network. The request may be terminating requests to a user for which the S-CSCF 13 is providing services. The S-CSCF 13 includes query unit 42 for querying user related information from the HSS 12. This information may include user profile and filter criteria. The receiving unit 41 may also receive responses to queries sent by the query unit 42. The receiving unit 41 may receive messages according to SIP or Diameter protocol. The S-CSCF 13 also comprises session case unit 43 for determining the IMS Session Case. The Session Cases the session case unit 43 is capable of determine and handle may include "ORIGINATING_CDIV" option according to this invention. A service execution unit 44 is executing services for the user. If the Session Case "ORIGINATING_CDIV" in determined by the session case unit 43, the service execution unit 44 may execute the services in a selectively manner, according to predefined rules, configuration and policies, aiming to execute only such services which are logical.

The advantage is that the HSS or the filter criteria or the user profile do not have to contain explicit instructions which services the S-CSCF should execute and which not. Instead only an indication of the situation (call forwarding) is transmitted to the S-CSCF and the S-CSCF can control the service execution based on the indication.

With this invention, by introducing a new Session Case in IMS, a service execution in the S-CSCF that is serving the forwarding user can be implemented in a correct way.

The invention is not limited to IMS networks, but may also be applied in other networks supporting call forwarding and service execution for users by the server entity. Therefore, the S-CSCF and the HSS are only used here as an example of servers. In the description terms "call" and "session", as well as, "forwarding" and "diverting"/"diversion" should be understood as meaning the same. Functions of the register entity (HSS) and the serving entity (S-CSCF) described above may be implemented by code means, as software, and loaded into memory of a computer. The memory or a computer-readable medium may be, for instance, a hard disk drive, flash device, random access memory (RAM), tape, or any other such medium used to store data.

We claim:

1. A register entity, comprising,
a storage unit configured to store service related data associated with a user of a communication network; and
a transmitting unit configured to transmit part of the service related data to a control entity of the communication network,
wherein the storage unit is configured to store in the service related data a Session Case of an Internet Protocol Multimedia subsystem (IMS) indicating originating services handling in call forwarding situation and wherein the transmitting unit is configured to transmit to the control entity the Session Case indicating originating services handling in call forwarding situation.

2. The register entity according to claim 1, wherein the register entity comprises a Home Subscriber Server (HSS).

3. The register entity according to claim 1, wherein the transmitting unit is configured to transmit the Session Case to an Interrogating Call State Control Function (I-CSCF) as part of a capability requirements parameter comprising capability requirements for a Serving Call State Control Function (S-CSCF) to be assigned for a user.

4. The register entity according to claim 1, wherein the transmitting unit is configured to transmit the Session Case to a Serving Interrogating Call State Control Function (S-CSCF) as part of a filter criteria.

5. A control entity comprising:
a storing unit configured to store information about serving entities of a communication system and about capabilities of the serving entities; and
a selecting unit configured to select a serving entity to serve a user of the communication system wherein the selecting comprises selecting based on
the capabilities of the serving entities stored by the storing unit, and
server capabilities received from a register entity,
wherein the selecting comprises selecting based on an indication in the server capabilities indicating ability to determine a Session Case of an Internet Protocol Multimedia subsystem (IMS) indicating originating services handling in call forwarding situation and on capabilities of the serving entities of the communication system to support originating services handling in call forwarding situation.

6. A serving entity comprising:
a receiving unit configured to receive a terminating request associated with a called user;
a service execution unit configured to execute services for the called user; and
a determination unit configured to determine a Session Case of an Internet Protocol Multimedia subsystem (IMS) associated with the called user which indicates originating services handling in call forwarding situation,
wherein the service execution unit is configured to execute, based on the Session Case, a set of services for the user.

7. The serving entity of claim 6, further comprising:
a service information unit configured to obtain service related information associated with the user from an external server and configured to receive the Session Case indicating originating services handling in call forwarding situation from the external server.

8. The serving entity of claim 6, wherein the set of services executed by the service execution unit comprises subset of originating services of an Internet Protocol Multimedia Subsystem.

9. The serving entity of claims 6, wherein the serving entity comprises a Serving Call State Control Function (S-CSCF) on an Internet Protocol Multimedia Subsystem Network.

10. The serving entity of claim 6, wherein the service information unit is configured to obtain the Session Case indicating originating services handling in call forwarding situation as part of filter criteria from a home subscriber server (HSS).

11. A method comprising:
storing service related data associated with a user of a communication network; and
transmitting part of the service related data to a control entity of the communication network,
wherein the service related data comprises a Session Case of an Internet Protocol Multimedia subsystem (IMS) indicating originating services handling in call forwarding situation and the Session Case is transmitted to the control entity.

12. A method comprising:
receiving a terminating request associated with a called user;
executing services for the called user; and
determining a Session Case of an Internet Protocol Multimedia subsystem (IMS) associated with the called user which indicates originating services handling in call forwarding situation, and
based on the Session Case, executing a set of services for the user.

13. A method comprising:
storing information about serving entities of a communication system and about capabilities of the serving entities; and
selecting a serving entity to serve a user of the communication system wherein the selecting comprises selecting based on
the stored capabilities of the serving entities, and
server capabilities received from a register entity,
wherein the selecting comprises selecting based on an indication in the server capabilities indicating ability to determine a Session Case of an Internet Protocol Multimedia subsystem (IMS) indicating originating services handling in call forwarding situation and on capabilities of the serving entities of the communication system to support originating services handling in call forwarding situation.

14. A computer program embodied on a non-transitory computer readable medium, the computer program being configured to control a processor to perform:
storing service related data associated with a user of a communication network; and
transmitting part of the service related data to a control entity of the communication network, wherein the service related data comprises a Session Case of an Internet Protocol Multimedia subsystem (IMS) indicating originating services handling in call forwarding situation and the Session Case is transmitted to the control entity.

15. A communication system operable to be implemented on a computer having a memory, the communication system comprising:

a register entity, comprising
a storage unit configured to store service related data associated with a user of a communication network, and
a transmitting unit configured to transmit part of the service related data to a control entity of the communication network,
wherein the storage unit is configured to store in the service related data a Session Case of an Internet Protocol Multimedia subsystem (IMS) indicating originating services handling in call forwarding situation and wherein the transmitting unit is configured to transmit to the control entity the Session Case indicating originating services handling in call forwarding situation;

a control entity comprising
a storing unit configured to store information about serving entities of a communication system and about capabilities of the serving entities, and
a selecting unit configured to select a serving entity to serve a user of the communication system wherein the selecting comprises selecting based on the capabilities of the serving entities stored by the storing unit, server capabilities received from a register entity,
wherein the selecting comprises selecting based on an indication in the server capabilities indicating ability to determine the Session Case of an Internet Protocol Multimedia subsystem (IMS) indicating originating services handling in call forwarding situation and on capabilities of the serving entities of the communication system to support originating services handling in call forwarding situation; and a serving entity comprising
a receiving unit configured to receive a terminating request associated with a called user,
a service execution unit configured to execute services for the called user, and
a determination unit configured to determine the Session Case of an Internet Protocol Multimedia subsystem (IMS) associated with the called user which indicates originating services handling in call forwarding situation,
wherein the service execution unit is configured to execute, based on the Session Case, a set of services for the user.

* * * * *